United States Patent
Wang et al.

(10) Patent No.: US 12,277,271 B2
(45) Date of Patent: Apr. 15, 2025

(54) METHOD FOR RENDERING VIDEO IMAGES IN VR SCENES

(71) Applicant: Samsung Electronics Co., Ltd., Suwon-si (KR)

(72) Inventors: Kun Wang, Jiangsu (CN); Jichun Li, Jiangsu (CN); Mengze Wang, Jiangsu (CN); Youxin Chen, Jiangsu (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/734,497

(22) Filed: Jun. 5, 2024

(65) Prior Publication Data

US 2025/0060814 A1     Feb. 20, 2025

Related U.S. Application Data

(63) Continuation of application No. PCT/IB2024/055190, filed on May 29, 2024.

(30) Foreign Application Priority Data

Aug. 18, 2023  (CN) .......................... 202311048685.2

(51) Int. Cl.
  *G06F 3/01*   (2006.01)
  *G06T 7/11*   (2017.01)
  *G06T 15/20*  (2011.01)

(52) U.S. Cl.
  CPC ................ *G06F 3/013* (2013.01); *G06T 7/11* (2017.01); *G06T 15/20* (2013.01);
  (Continued)

(58) Field of Classification Search
  None
  See application file for complete search history.

(56) References Cited

U.S. PATENT DOCUMENTS 11,776,133 B2   10/2023   Kim et al.
11,778,155 B2   10/2023   Yano
(Continued)

FOREIGN PATENT DOCUMENTS

CN    116962814 A    10/2023
JP    2019/036122 A    3/2019
(Continued)

OTHER PUBLICATIONS

International Search Report and Written Opinion dated Sep. 26, 2024, issued in International Application No. PCT/IB2024/055190.

*Primary Examiner* — Christopher J Kohlman
(74) *Attorney, Agent, or Firm* — Jefferson IP Law, LLP

(57) ABSTRACT

A method and a system for rendering video images in virtual reality (VR) scenes are provided. The method includes providing a video image at a current time point, dividing the video image at the current time point into a plurality of sub-regions, inputting image feature information of the sub-regions and acquired user viewpoint feature information into a trained attention model for processing to obtain attention coefficients of the sub-regions indicating probability values at which user viewpoints at a next time point fall into the sub-regions, rendering the sub-regions based on the attention coefficients of the sub-regions to obtain a rendered video image at the current time point, inputting the attention coefficients of the sub-regions and the image feature information of the sub-regions into a trained user eyes trajectory prediction model for processing, obtaining user eyes trajectory information in a current time period, dividing, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period, and rendering the corresponding sub-regions based on the attention coefficients of the sub-regions to obtain a rendered video image at each of the subsequent time points.

20 Claims, 17 Drawing Sheets

(52) U.S. Cl.
CPC .............. *G06T 2207/10016* (2013.01); *G06T 2207/10048* (2013.01); *G06T 2207/20081* (2013.01); *G06T 2207/30201* (2013.01); *G06T 2207/30241* (2013.01); *G06T 2207/30268* (2013.01)

(56) References Cited

U.S. PATENT DOCUMENTS

| | | | |
|---|---|---|---|
| 2014/0361977 A1* | 12/2014 | Stafford | A63F 13/212 345/156 |
| 2018/0182168 A1 | 6/2018 | Laurent et al. | |
| 2018/0190091 A1 | 7/2018 | Yuan | |
| 2020/0273431 A1* | 8/2020 | Dong | G09G 5/37 |
| 2021/0333870 A1* | 10/2021 | Wang | G06T 3/4038 |
| 2021/0350552 A1 | 11/2021 | Gibbon et al. | |
| 2022/0138901 A1* | 5/2022 | Shi | G06V 40/18 382/299 |
| 2022/0150457 A1 | 5/2022 | Yano | |
| 2023/0086766 A1* | 3/2023 | Olwal | H04N 21/41407 725/10 |
| 2023/0133228 A1 | 5/2023 | Kim et al. | |
| 2023/0396748 A1 | 12/2023 | Yano | |
| 2024/0267559 A1* | 8/2024 | Hamada | H04N 19/132 |

FOREIGN PATENT DOCUMENTS

| | | |
|---|---|---|
| JP | 2022/051978 A | 4/2022 |
| JP | 2022/077380 A | 5/2022 |
| KR | 10-2023-0062322 A | 5/2023 |

\* cited by examiner

FIG. 2

| visual behavior factor information | | context factor information | |
|---|---|---|---|
| Position information: distance information and change information (dynamic and still) | Textures: hue, saturation, and lightness | system guidance | user intention expression data |
| | Mesches: volume and shape | Task directivity data | user intention expression data |
| reflective attention mechanism | | text data | voice conversation data |
| The attention coefficient is enhanced: | | Extract the description related to the subject in the VR scene: text information & voice content | |
| The distance is close | the subject is moving | description of subject that is systematically emphasized in a behavior path | The attention coefficient is enhanced: |
| similarity attention mechanism | | The role of the relevant description on the target subject | |
| comparing the subject and the current attention: | | Enhancing coefficient | decreasing coefficient |
| the coefficient is enchanced: conform to user attention habits | | | |
| the coefficient remains unchanged: do not conforming to user attention habits | | | |

FIG. 7
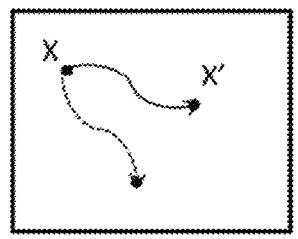 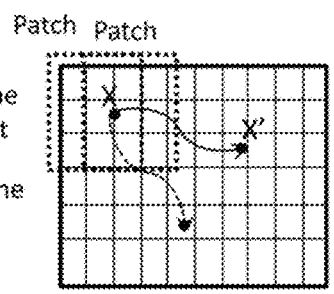 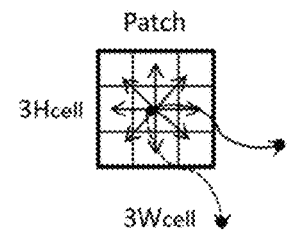

FIG. 11

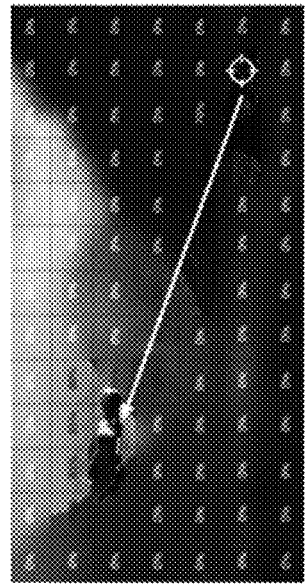

1130: Evaluate the attention coefficient of each sub-region according to the analysis result According to the determination results, the model in the initial state provides the attention coefficient evaluation results as shown in the figure on the right

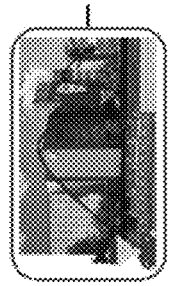

1140: Train the user eyes trajectory prediction model after user

User: vertical view of sight
Trajectory habit
Supplementary data analysis: Learn the user's visual habit analysis to obtain the visual action trajectory different from the initial state

1110: only provide render result at the current time point of the user

1120: attention analysis result

Model analysis result:
Based on the data in the scene, the system determines that the car flying in the sky in the scene is the final visual landing point of the user in the current stage

FIG. 12B

1240: According to different analysis results, render the objects whose correlation coefficient exceeds 80% of the threshold in advance, and generate multi-angle videos and store

 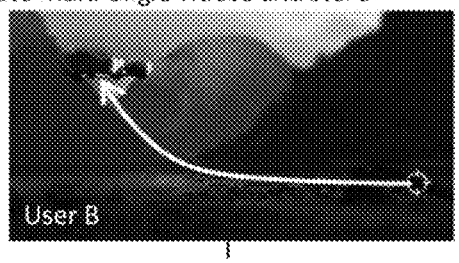

User A   OR   User B

1250

Release, when the eyes of the user fall on a corresponding Patch, a stored pre-rendering result of the sub-region according to an actual behavior of the user, so as to complete presentation in a VR scene

FIG. 13

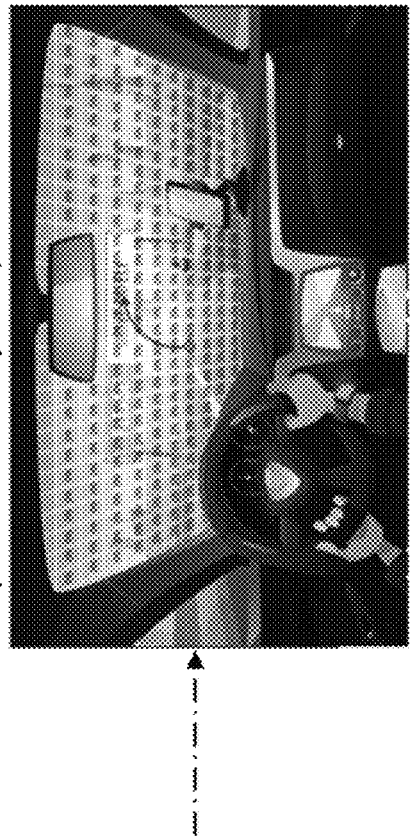

1310: Equip a vehicle with an infrared camera capable of detecting eye movement data of a drive

1320: Dynamically analyze a current gazing point of the driver in the driving process, and predict user eyes attention trajectory

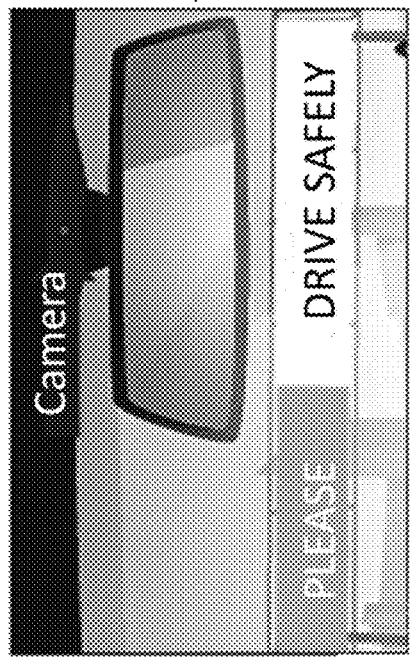

1340: Remind the user of potential safety driving hazard information in subsequent driving by voice(or other manners)

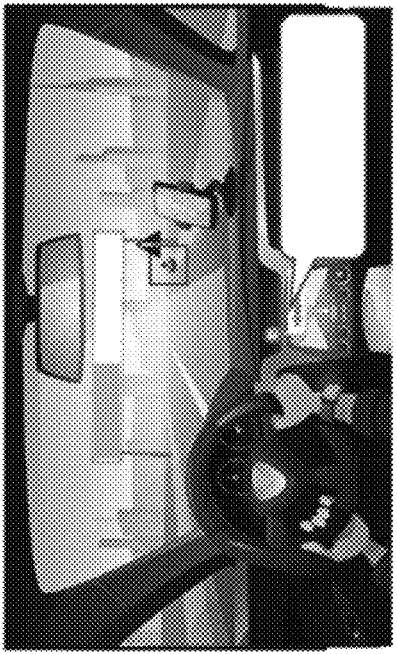

1330: Compare user attention trajectory Path, and extract and find potential safety driving hazard information that may exist outside the range of the attention of the user

METHOD FOR RENDERING VIDEO IMAGES IN VR SCENES

CROSS-REFERENCE TO RELATED APPLICATION(S)

This application is a continuation application, claiming priority under § 365 (c), of an International application No. PCT/IB2024/055190, filed on May 29, 2024, which is based on and claims the benefit of a Chinese patent application number 202311048685.2, filed on Aug. 18, 2023, in the China National Intellectual Property Administration, the disclosure of which is incorporated by reference herein in its entirety.

TECHNICAL FIELD

The disclosure relates to virtual reality (VR) technology. More particularly, the disclosure relates to a method and system for rendering video images in VR scenes.

BACKGROUND ART

With the development of VR technology, devices with the VR technology, such as VR glasses or VR head-up display devices, are gradually commercialized. The VR device obtains a VR video image from an acquired video image through a process suitable for VR presentation and presents the VR video image to a user. The process suitable for VR presentation is rendering the video image. Due to the limited computing resources of the VR device, the rendering rate of the video image is often lower than the presentation rate of the VR video image, which leads to the delay problem when the VR device presents the VR video image.

When the VR device is rendering the video image, the rendering quality also directly affects the quality of the VR video image presented subsequently. Therefore, under the premise of saving the computing resources of the VR device, it is an urgent technical problem to be solved that which rendering mode with high rendering quality is adopted to render the video image so that the rendered VR video image is not delay in presentation, a user will be not feel dizzy when using the VR device, and the user experience is improved.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, as aspect of the disclosure is to provide a method for rendering video images in VR scenes. The method can consider user viewpoint trajectory information when rendering a video image in a VR scene and improve the rendering quality of the video image.

Another aspect of the disclosure is to provide a system for rendering video images in VR scenes. The system can consider user viewpoint trajectory information when rendering a video image in a VR scene and improve the rendering quality of the video image.

Additional aspects will be set forth in part in the description which follows and, in part, will be apparent from the description, or may be learned by practice of the presented embodiments.

In accordance with an aspect of the disclosure, a method for rendering video images in virtual reality (VR) scenes is provided. The method includes providing a video image at a current time point, dividing the video image at the current time point into a plurality of sub-regions, inputting image feature information of the sub-regions and acquired user viewpoint feature information into a trained attention model for processing to obtain attention coefficients of the sub-regions indicating probability values at which user viewpoints at a next time point fall into the sub-regions, rendering the sub-regions based on the attention coefficients of the sub-regions to obtain a rendered video image at the current time point, inputting the attention coefficients of the sub-regions and the image feature information of the sub-regions into a trained user eyes trajectory prediction model for processing, and obtaining user eyes trajectory information in a current time period, dividing, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period, and rendering the corresponding sub-regions based on the attention coefficients of the sub-regions to obtain a rendered video image at each of the subsequent time points.

In the above embodiment, the method further includes releasing the rendered video images at the time points within the time period chronologically, and collecting user viewpoint information at the corresponding time points, and forming, when the user viewpoint information falls into a sub-region in the rendered video images, the sub-region rendered into a VR scene for presentation.

In the above embodiment, the acquired user viewpoint feature information includes visual behavior factor information and context factor information.

The visual behavior factor information includes texture information Textures of the sub-regions, mesh information Meshes of the sub-regions, and position information of the sub-regions.

The context factor information includes user intention expression data, text data, voice conversation data, system guidance data, and Task directivity data.

In the above embodiment, the manners of dividing the video image at the current time point into the plurality of sub-regions and dividing the video images at the subsequent time points into the plurality of sub-regions are the same, including mapping the video image into a two-dimensional video image, the video image being a VR scene within a user eyes range defined by the sum of an angle of view field (FOV) of the user eyes and a set angle α, and inputting image feature information of the two-dimensional video image into a trained division model to obtain a plurality of sub-regions divided and corresponding user viewpoint feature information.

In the above embodiment, before obtaining the attention coefficients of the sub-regions, the method further includes processing the sub-regions based on a foveal principle to obtain the attention coefficients of the sub-regions.

In the above embodiment, the training process of the user eyes trajectory prediction model includes inputting the attention coefficients of the sub-regions in the video image at the current time point and the image feature information of the sub-regions into a user trajectory prediction model established based on user visual habit information for training, and outputting user eyes trajectory probability values of the sub-regions, a ground truth (GT) of the user eyes trajectory prediction model being determined by using a user eyes trajectory of a user gazing from the sub-regions to adjacent sub-regions, and adjusting the user trajectory prediction model based on the recorded user visual habit information in the training process until the training is completed.

In the above embodiment, the obtaining the user eyes trajectory information in the current time period further includes determining, based on real eyes trajectory information of the user within the current time period, whether the user eyes trajectory information in the current time period directly obtained by processing through the user eyes trajectory prediction model is accurate, taking, if yes, the user eyes trajectory information in the current time period directly obtained by processing through the user eyes trajectory prediction model as the obtained user eyes trajectory information in the current time period, and taking, if no, the real eyes trajectory information of the user within the current time period as the obtained user eyes trajectory information in the current time period, and optimally training the user eyes trajectory prediction model based on the real eyes trajectory information of the user within the current time period.

In the above embodiment, the calculating attention coefficients of the sub-regions in the video image at each of the subsequent time points within the current time period respectively based on the user eyes trajectory information in the current time period includes determining, for a sub-region in the video image at each of the subsequent time points within the current time period, whether the user eyes fall into the sub-region based on the user eyes trajectory information in the current time period, enhancing, if yes, the attention coefficient of the sub-region according to a set amplitude on the basis of the attention coefficient at a corresponding previous time point, and decreasing, if no, the attention coefficient of the sub-region according to the set amplitude on the basis of the attention coefficient at the corresponding previous time point.

In the above embodiment, the rendering the corresponding sub-regions based on the attention coefficients of the sub-regions includes setting an attention coefficient threshold, determining whether the attention coefficients of the sub-regions exceed the set attention coefficient threshold set, rendering, if yes, the sub-regions using a set high-level rendering mode, and rendering, if no, the sub-regions using a set low-level rendering mode.

In accordance with another aspect of the disclosure, a system for rendering video images in virtual reality (VR) scenes is provided. The system includes a processing unit for video image at current time point, a user eyes trajectory information prediction unit, and a processing unit for video image in current time period, wherein the processing unit for video image at current time point is configured to provide a video image at a current time point, divide the video image at the current time point into a plurality of sub-regions, input image feature information of the sub-regions and acquired user viewpoint feature information into a trained attention model for processing to obtain attention coefficients of the sub-regions indicating probability values at which user viewpoints at a next time point fall into the sub-regions, and render the sub-regions based on the attention coefficients of the sub-regions to obtain a rendered video image at the current time point, wherein the user eyes trajectory information prediction unit is configured to input the attention coefficients of the sub-regions and the image feature information of the sub-regions into a trained user eyes trajectory prediction model for processing, and obtain user eyes trajectory information in a current time period, and wherein the processing unit for video image in current time period is configured to divide, for video images at subsequent time points within the current time period, the video images at the subsequent time points into a plurality of sub-regions, calculate attention coefficients of the sub-regions in the video image at each of the subsequent time points within the current time period respectively based on the user eyes trajectory information in the current time period, and render the corresponding sub-regions based on the attention coefficients of the sub-regions to obtain a rendered video image at each of the subsequent time points.

In accordance with another aspect of the disclosure, an electronic device is provided. The electronic device includes memory storing one or more computer programs, and one or more processors, wherein the one or more computer programs include computer-executable instructions that, when executed by the one or more processors, cause the electronic device to provide a video image at a current time point, divide the video image at the current time point into a plurality of sub-regions, inputting image feature information of the sub-regions and acquired user viewpoint feature information into a trained attention model for processing to obtain attention coefficients of the sub-regions indicating probability values at which user viewpoints at a next time point fall into the sub-regions, render the sub-regions based on the attention coefficients of the sub-regions to obtain a rendered video image at the current time point, input the attention coefficients of the sub-regions and the image feature information of the sub-regions into a trained user eyes trajectory prediction model for processing, obtain user eyes trajectory information in a current time period, divide, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period, and render the corresponding sub-regions based on the attention coefficients of the sub-regions to obtain a rendered video image at each of the subsequent time points.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include providing a video image at a current time point, dividing the video image at the current time point into a plurality of sub-regions, inputting image feature information of the sub-regions and acquired user viewpoint feature information into a trained attention model for processing to obtain attention coefficients of the sub-regions indicating probability values at which user viewpoints at a next time point fall into the sub-regions, rendering the sub-regions based on the attention coefficients of the sub-regions to obtain a rendered video image at the current time point, inputting the attention coefficients of the sub-regions and the image feature information of the sub-regions into a trained user eyes trajectory prediction model for processing, obtaining user eyes trajectory information in a current time period, dividing, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period, and rendering the corresponding sub-regions based on the attention coefficients of the sub-regions to obtain a rendered video image at each of the subsequent time points.

As can be seen from the above, according to this embodiment of the disclosure, a video image at each time point within a current time period is dynamically rendered based on user viewpoint trajectory information. In a VR scene obtained for subsequent presentation to a user, the eyes of the user are considered, thus improving the rendering quality of the video image.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 2 is a schematic diagram of a relationship between factor information affecting user viewpoint feature information of a sub-region and an attention coefficient of the sub-region according to an embodiment of the disclosure;

FIG. 7 is a schematic diagram of a relationship between a user eyes trajectory and an attention coefficient of a sub-region of a video image according to an embodiment of the disclosure;

FIG. 11 is a flowchart of a scheme for predicting user eyes trajectory information in specific example 2 according to an embodiment of the disclosure;

FIG. 12B is a schematic diagram of a process of rendering different sub-regions in a video image based on user eyes trajectory information in specific example 3 according to an embodiment of the disclosure;

FIG. 13 is an implementation process diagram of specific example 4 according to an embodiment of the disclosure;

Throughout the drawings, it should be noted that like reference numbers are used to depict the same or similar elements, features, and structures.

MODE FOR INVENTION

Figure 1:
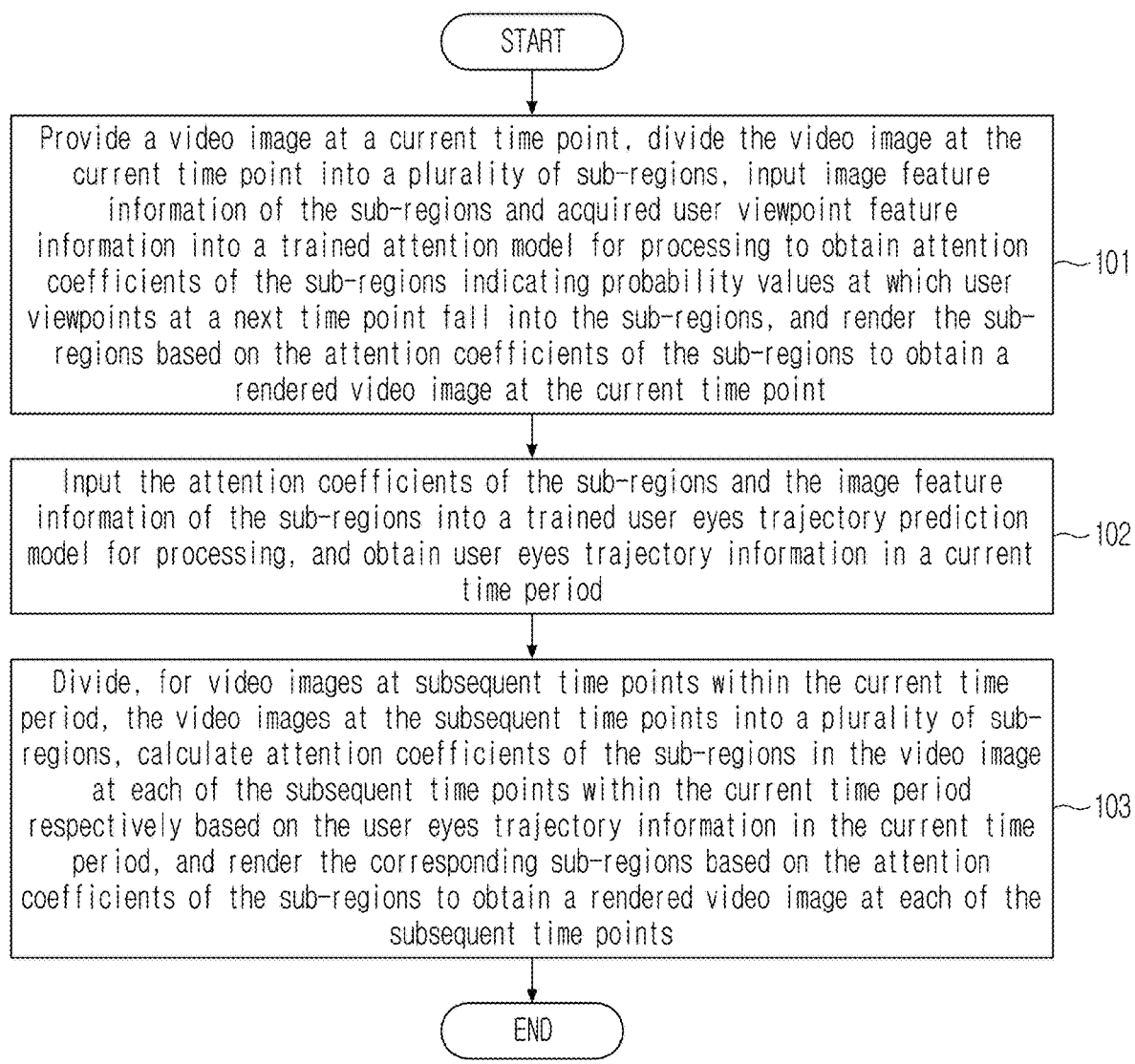
FIG. 1 is a schematic flowchart of a method for rendering video images in VR scenes according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first", "second", "third", "fourth", etc. (if present) in the description and claims of the disclosure and in the above drawings are used for distinguishing between similar objects and not necessarily for describing a particular order or sequential order. It will be appreciated that data so used are interchangeable under appropriate circumstances, whereby the embodiments of the disclosure described herein can be, for example, implemented in orders other than those illustrated or described herein. Furthermore, the terms "including", "having", and any variations thereof are intended to cover non-exclusive inclusion. For example, a process, method, system, product, or device that includes a series of steps or units does not need to be limited to those clearly listed, but may include other steps or units that are not clearly listed or are inherent to the process, method, product, or device.

The technical solution of the disclosure will be described in detail with specific embodiments below. The following specific embodiments may be combined with one another and may not be repeated in some embodiments for the same or similar concepts or processes.

At present, in order to overcome the problem of delay in presenting a VR video image by a VR device, a buffer may be provided in the VR device to cache the rendered VR video image, and the VR video image may be acquired from the buffer during rendering. This mode may improve the presentation effect of the VR video image. However, the problem that the VR device occupies too many computing resources when rendering the video image is not solved substantially. The VR device occupies too many computing resources to render the video image, thus reducing the rendering quality of the video image and affecting the rendering quality of the rendered VR video image.

In this case, in order to overcome the problem that the VR device occupies too many computing resources to render the video image, the mode of rendering the video image may be optimized to reduce the computing amount of the VR device. For example, the first mode is a region-divided rendering mode: rendering a foveal region and a peripheral region in the video image respectively, whereby the foveal region has higher resolution than the peripheral region. For another example, the second mode is a mode of predicting a motion region in the video image and then rendering the motion region: dividing the motion of the video image into a camera translation motion, an object motion, and a camera rotation motion, processing the camera translation motion by using a parallax mapping principle to obtain a first extrapolated image after the camera translation motion, extrapolating an object motion image using the first extrapolated image by using a camera translation motion correction algorithm and a fixed point iteration method, and obtaining the rendered VR video image after computing by a smoothing algorithm.

According to both modes, the computing amount of the VR device is reduced by reducing the rendering quality when rendering the video image. Although the dynamic influence of the camera motion on the object motion is considered when rendering the video image, the second mode, compared with the first mode of statically rendering the video image, improves the rendering quality of the video image. However, either mode is only limited to improve the rendering quality of the video image. The degree of improvement of image rendering quality is limited by the accuracy of the mode used, and the rendering quality of the video image cannot be improved substantially.

It can be seen that under the premise of limited computing resources, the VR device will improve the rendering of the video image to obtain the VR video image in order to ensure the rendering quality of the VR video image without rendering delay of the VR video image and other problems. However, the improvement of image rendering quality is limited by the accuracy of the improved rendering mode used, and the rendering quality of the video image cannot be improved substantially. In addition, problems that affect the user experience when a user views a VR video image presented in a VR scene of a VR device such as dizziness are caused not only due to delay in the presentation of the VR video image, but also due to low rendering quality of the video image by adopting an improved rendering mode. Whether the user feels dizzy in the presented VR video image depends on user eyes to a great extent. However, in the above rendering improvement mode, rendering is not based on user eyes interactive information, whereby the user is unnatural in realizing the interactive application of gazing the selected content of the VR video image, feels dizzy, and has a bad user experience.

Therefore, according to this embodiment of the disclosure, in order to solve the above problems, a video image at each time point within a current time period is dynamically rendered based on user viewpoint trajectory information. In a VR scene obtained for subsequent presentation to a user, the eyes of the user are considered, thus improving the rendering quality of the video image.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a schematic flowchart of a method for rendering video images in VR scenes according to an embodiment of the disclosure.

Referring to FIG. 1, the method includes the following specific operations:

Operation 101: Provide a video image at a current time point, divide the video image at the current time point into a plurality of sub-regions, input image feature information of the sub-regions and acquired user viewpoint feature information into a trained attention model for processing to obtain attention coefficients of the sub-regions indicating probability values at which user viewpoints at a next time point fall into the sub-regions, and render the sub-regions based on the attention coefficients of the sub-regions to obtain a rendered video image at the current time point.

Operation 102: Input the attention coefficients of the sub-regions and the image feature information of the sub-regions into a trained user eyes trajectory prediction model for processing, and obtain user eyes trajectory information in a current time period.

Operation 103: Divide, for video images at subsequent time points within the current time period, the video images at the subsequent time points into a plurality of sub-regions, calculate attention coefficients of the sub-regions in the video image at each of the subsequent time points within the current time period respectively based on the user eyes trajectory information in the current time period, and render the corresponding sub-regions based on the attention coefficients of the sub-regions to obtain a rendered video image at each of the subsequent time points.

After that, the method further includes releasing the rendered video images at the time points within the time period chronologically; and collecting user viewpoint information at the corresponding time points, and forming, when the user viewpoint information falls into a sub-region in the rendered video images, the sub-region rendered into a VR scene for presentation.

In the method, both rendering and presentation are implemented by a VR device such as VR glasses or a VR head-up display device.

The attention coefficients of the sub-regions indicate probability values at which user viewpoints at a next time point fall into the sub-regions. When the user viewpoints fall into the sub-regions at a next time point, the attention coefficients of the sub-regions are 1.

A video image at a current time point within a current time period and a video image at a subsequent time point present a VR scene based on user eyes. Each of the video image at the current time point and the video image at the subsequent time point is divided into a plurality of sub-regions by a preset division model, and the plurality of sub-regions are rendered in advance based on calculated attention coefficients.

It can be seen that each video image within a current time period is divided into a plurality of sub-regions, image feature information of each sub-region is combined with user eyes trajectory information within the current time period, an attention coefficient of each sub-region is determined, and each video image is rendered in advance accordingly, whereby the rendering quality of the video image by the VR device can be improved, thereby improving the presentation quality of a subsequent VR video image, preventing the user from feeling dizzy when viewing the VR video image, and improving the user experience.

According to the intention analysis of the user eyes to the selection of the sub-regions in the video image, factor information affecting the acquired user viewpoint feature information includes visual behavior factor information and context factor information. Reference is made to FIG. 2.

FIG. 2 is a schematic diagram of a relationship between factor information affecting user viewpoint feature information of a sub-region and an attention coefficient of the sub-region according to an embodiment of the disclosure.

Referring to FIG. 2, the visual behavior factor information includes: texture information (Textures), mesh information (Meshes), and position information. Textures specifically refer to the hue, saturation, and lightness of the sub-region. Meshes specifically refer to the volume and shape of the sub-region. The position information includes the distance information and change information of the sub-region. When using an attention model for processing, a similarity attention mechanism and a reflective attention mechanism are adopted. When the similarity attention mechanism is adopted, the similarity degree between the visual factor information of a sub-region and the acquired user viewpoint information at the current time point is compared: if the visual factor information of the sub-region conforms to the current user viewpoint information, the attention coefficient of the sub-region is enhanced. If the visual factor information of the sub-region does not conform to the current user viewpoint information, the attention coefficient remains unchanged. When the reflective attention mechanism is adopted, the attention coefficient of the sub-region is enhanced when the sub-region is close to the user viewpoint information or/and the subject of the sub-region is moving. The context factor information includes user intention expression data, text data, voice conversation data, system guidance data, and Task directivity data. A description related to a subject in a current VR scene is extracted from the user intention expression data, the text data, and the voice conversation data in the context factor information. The attention coefficient of the sub-region is enhanced when the extracted description related to the subject in the current VR scene is similar to the image feature information of the sub-region. The attention coefficient of the sub-region is weakened when the extracted description related to the subject in the current VR scene is not similar to the image feature information of the sub-region. A system-emphasized description of the subject in the current VR scene is extracted from the system guidance data and the Task directivity data in the context factor information. The attention coefficient of the sub-region is enhanced when the extracted system-emphasized description of the subject in the current VR scene is similar to the image feature information of the sub-region.

The manners of dividing the video image at the current time point into a plurality of sub-regions and dividing the video images at the subsequent time points into a plurality of sub-regions are the same, specifically including: mapping the video image into a two-dimensional video image, the video image being a VR scene within a user eyes range defined by the sum of a field of view (FOV) of the user eyes and a set angle ($\alpha$); and inputting image feature information of the two-dimensional video image into a trained division model to obtain a plurality of sub-regions divided and corresponding user viewpoint feature information. Here, the corresponding user viewpoint feature information may be represented by mask features.

Figure 3:
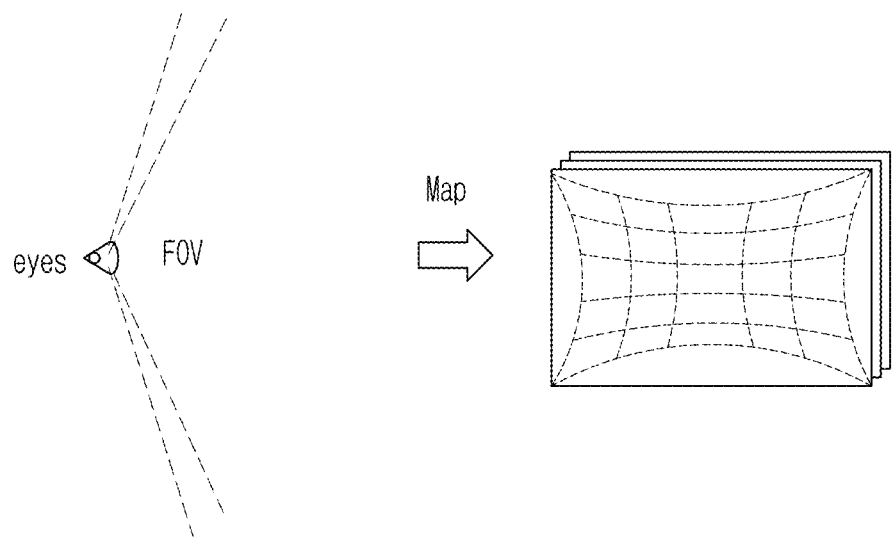
FIG. 3 is a schematic diagram of mapping a video image into a two-dimensional video image according to an embodiment of the disclosure.

FIG. 3 shows a schematic diagram of mapping a video image into a two-dimensional video image according to an embodiment of the disclosure.

Referring to FIG. 3, the VR scene within the user eyes range defined by the sum of the FOV of the user eyes and a forms a two-dimensional video image.

Figure 4:
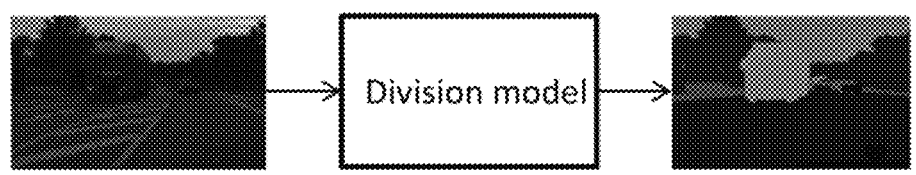
FIG. 4 is a schematic diagram of implementation of a division model according to an embodiment of the disclosure.

FIG. 4 shows a plurality of sub-regions and masks of the sub-regions are obtained after sub-region segmentation by a division model according to an embodiment of the disclosure.

Referring to FIG. 4, the value of a is set to be slightly greater than the FOV of the user eyes, and smaller than a displayable VR scene range of the VR device, for example, less than 3°. The division model may be based on a neural network of image segmentation, such as Segmentation models.

Figure 5:
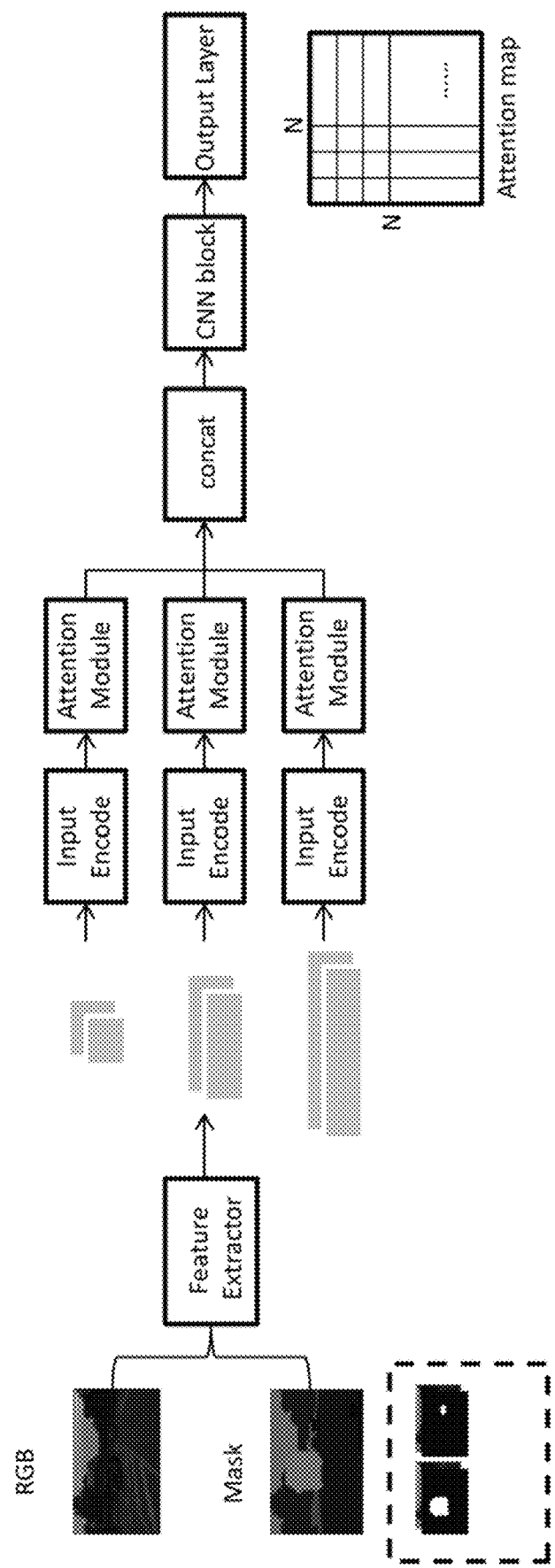
FIG. 5 is a flowchart of a process of calculating an attention coefficient of a sub-region at a current time point using an attention model according to an embodiment of the disclosure

In accordance with an embodiment of the disclosure, the attention model in FIG. 1 may be implemented using a convolutional neural network (CNN). Reference is made to FIG. 5.

FIG. 5 is a flowchart of a process of calculating an attention coefficient of a sub-region at a current time point using an attention model according to an embodiment of the disclosure.

Referring to FIG. 5, the image feature information of the sub-region (represented as red, green, and blue (RGB) in the figure) and the extracted user viewpoint feature information (represented as mask in the figure) are respectively extracted, encoded, and inputted into the attention model to calculate the attention coefficient. After a connection layer (concat) in the attention model is connected, the attention coefficient of each sub-region in the video image at the current time point is obtained by processing via a CNN block, and outputted through an output layer of the attention model. The attention coefficient of each sub-region in the video image reflects the confidence of the user eyes at the next time point, whereby a certain sub-region to which the user eyes move at the next time point may be predicted. The attention coefficient of each sub-region in the video image at the current time point is outputted in the form of an attention map, and attention map$\in R^{n*n}$, where R represents each sub-region. Each sub-region is composed of n*n elements, where the value of n may be 3.

Before the attention coefficient of each sub-region, this embodiment of the disclosure also processes each sub-region based on the foveal principle. For example, the attention coefficient from a center sub-region to an edge sub-region of the video image is attenuated by a set amplitude based on the foveal principle.

Figure 6:
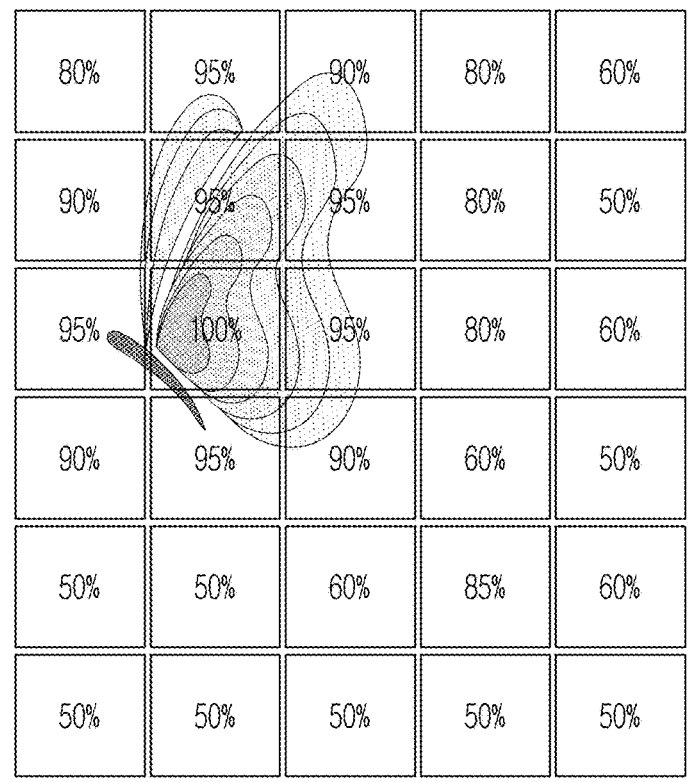
FIG. 6 is a schematic diagram of an attention coefficient of a sub-region at a current time point according to an embodiment of the disclosure.

FIG. 6 is a schematic diagram of an attention coefficient of a sub-region at a current time point according to an embodiment of the disclosure.

Referring to FIG. 6, the attention coefficient of each divided sub-region of the video image not only considers the user viewpoint feature information extracted from the sub-region, but also considers the foveal principle, so as to determine a subsequent user eyes trajectory and provide a basis for the calculation of the attention coefficient of the sub-region at the subsequent time point.

In specific implementation, reference is made to FIG. 7.

FIG. 7 is a schematic diagram of a relationship between a user eyes trajectory and an attention coefficient of a sub-region of a video image according to an embodiment of the disclosure.

Referring to FIG. 7, the two-dimensional video image mapped from the video image is divided into a plurality of sub-regions. Each sub-region includes 3*3 elements. Each sub-region is represented as a patch. Each element contains a plurality of pixels. Each element is represented as a cell. An attention coefficient of each cell is obtained by weighted average of attention coefficients of the plurality of pixels contained therein. A user viewpoint motion trajectory is obtained by recording via the VR device. A user eyes trajectory of the user gazing from the current sub-region to the adjacent sub-region is counted as a ground truth (GT) of the user eyes trajectory prediction model. The user eyes trajectory prediction model is trained.

The training process of the user eyes trajectory prediction model may include inputting the attention coefficients of the sub-regions in the video image at the current time point and the image feature information of the sub-regions into a user trajectory prediction model established based on user visual habit information for training, and outputting user eyes trajectory probability values of the sub-regions, the GT of the user eyes trajectory prediction model being determined using a user eyes trajectory of a user gazing from the current sub-region to adjacent sub-regions; and recording user visual habit information in the training process, and adjusting the user trajectory prediction model until the training is completed.

Figure 8:
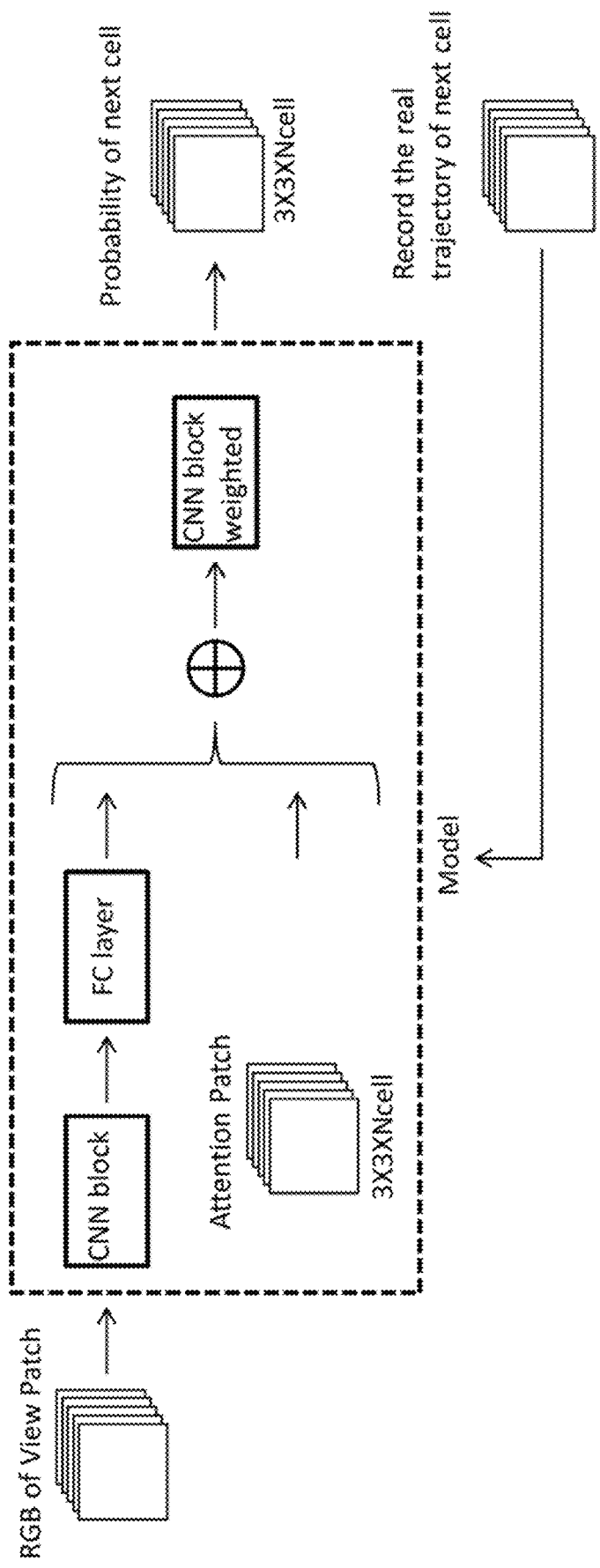
FIG. 8 is a schematic diagram of a process of training a user eyes trajectory prediction model according to an embodiment of the disclosure.

The above process is shown in FIG. 8.

FIG. 8 is a schematic diagram of a process of training a user eyes trajectory prediction model according to an embodiment of the disclosure.

Referring to FIG. 8, the user eyes trajectory prediction model may be a CNN model. The image feature information of the sub-region is represented as RGB of View Patch. The attention coefficient of the sub-region is represented as Attention Patch. The user trajectory prediction model is trained. The GT of the user trajectory prediction model is determined based on the user visual habit information (Record the real trajectory of next cell).

The process of obtaining user eyes trajectory information in a current time period may further include determining, based on real eyes trajectory information of the user within the current time period, whether the user eyes trajectory information in the current time period directly obtained by processing through the user eyes trajectory prediction model is accurate; taking, if yes, the user eyes trajectory information in the current time period directly obtained by processing through the user eyes trajectory prediction model as the obtained user eyes trajectory information in the current time period; and taking, if no, the real eyes trajectory information of the user within the current time period as the obtained user eyes trajectory information in the current time period, and optimally training the user eyes trajectory prediction model based on the real eyes trajectory information of the user within the current time period.

When the user eyes trajectory information in the current time period directly predicted by the user eyes trajectory prediction model is inaccurate, in order to improve the user experience, real user eyes trajectory information in the current time period is directly adopted for subsequent execution, instead of the predicted user eyes trajectory information in the current time period for subsequent execution. At the same time, it also shows that the user eyes trajectory prediction model is not accurate enough, and optimization training is needed based on the real user eyes trajectory information in the current time period to improve the subsequent prediction accuracy of the user eyes trajectory prediction model.

Definitely, when the user eyes trajectory information in the current time period directly predicted by the user eyes trajectory prediction model is inaccurate, the user eyes trajectory model may be optimally trained based on the real user eyes trajectory information in the current time period. Then the optimally trained user eyes trajectory model is used for re-prediction, and the obtained direct prediction result is taken as the obtained user eyes trajectory information in the current time period.

The process of calculating attention coefficients of the sub-regions in the video image at each of the subsequent time points within the current time period respectively based on the user eyes trajectory information in the current time period may include determining, for a sub-region in the video image at each of the subsequent time points within the current time period, whether the user eyes fall into the sub-region based on the user eyes trajectory information in the current time period, enhancing, if yes, the attention coefficient of the sub-region according to a set amplitude on the basis of the attention coefficient at a corresponding previous time point, and weakening, if no, the attention coefficient of the sub-region according to the set amplitude on the basis of the attention coefficient at the corresponding previous time point. Here, the setting range may be set as required without limitation.

The process of rendering the corresponding sub-regions based on the attention coefficients of the sub-regions may include setting an attention coefficient threshold, determining whether the attention coefficients of the sub-regions exceed the set attention coefficient threshold, rendering, if yes, the sub-regions using a set high-level rendering mode, and rendering, if no, the sub-regions using a set low-level rendering mode. Here, the attention coefficient threshold may be set to 80%. The high-level rendering mode is rendering with a set time period in advance, or/and rendering with a set high-level resolution. The low-level rendering mode is normal rendering or rendering with a set low-level resolution.

In order to realize this embodiment of the disclosure, three neural network models are trained: a division model, an attention model, and a user eyes trajectory prediction model. Through the organic cooperation of the three neural network models, the rendering of the video image in the VR scene within the current time period is realized.

Figure 9:
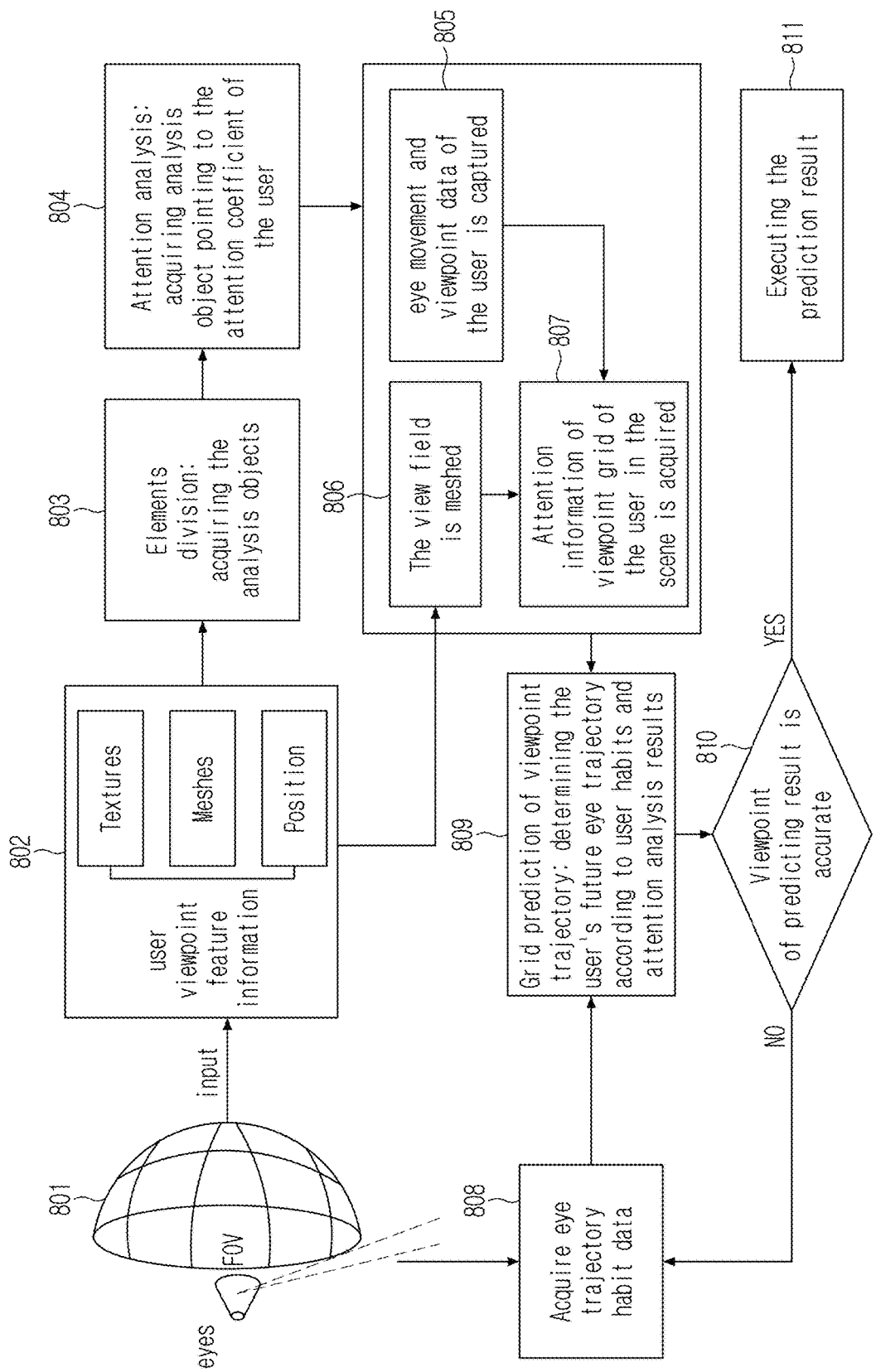
FIG. 9 is a flowchart of a specific example of a method for rendering video images according to an embodiment of the disclosure.

FIG. 9 is a flowchart of a specific example of a method for rendering video images according to an embodiment of the disclosure.

Referring to FIG. 9, the method includes the following operations:

Operation 801: Acquire a VR scene within a current time period. In operation 801, the VR scene is composed of a video image at a current time point and video images at subsequent time, and these video images are acquired one by one.

Operation 802: Extract user viewpoint feature information of the VR scene. In operation 802, information such as textures, meshes, and position information is included.

Operation 803: Divide the video image at the current time point to obtain a plurality of sub-regions.

Operation 804: Input, for each sub-region, image feature information of the sub-region and the user viewpoint feature information into an attention model for processing, obtain an attention coefficient of the sub-region, and form an attention coefficient map of the sub-regions of the video image at the current time point.

Operation 805: Capture eye movement and viewpoint data of a user at the current time point.

Operations 806 and 807: Divide the VR scene, and determine the user viewpoint feature information according to the sub-regions.

Operation 808: Acquire user visual habit information, and dynamically adjust a user trajectory prediction model. Here, the user trajectory prediction model may be set and dynamically adjusted based on the user visual habit information. Specifically, parameters in the user trajectory prediction model may be adjusted.

Operation 809: Input the attention coefficient map of each of the sub-regions of the video image at the current time point and the user viewpoint feature information determined according to the sub-regions into a user eyes trajectory prediction model for processing to obtain user eyes trajectory information in the current time period.

Operation 810: Predict, for each time point in the VR scene, user viewpoint information based on the user eyes trajectory information in the current time period, and determine whether the predicted user viewpoint information is accurate. If yes, operation 811 is performed. If no, subsequent execution is performed based on real user viewpoint information in the current time period, and real user eyes trajectory information is saved. Operation 808 is performed again to continue optimally training the user eyes trajectory prediction model based on the real user eyes trajectory information.

In operation 810, when the predicted user viewpoint information is incorrect, the real user viewpoint information in the current time period may be directly obtained for subsequent execution. The sub-regions in the video images at the subsequent time points within the current time period are rendered based on the real user eyes trajectory information in the current time period. After that, the real user eyes trajectory information is recorded, and the user eyes trajectory prediction model is optimally trained subsequently to enhance the prediction accuracy of the user trajectory prediction model.

In operation 810, when the predicted user viewpoint information is incorrect, the user eyes trajectory prediction model is optimally trained directly based on the real user eyes trajectory information in the current time period, and then the optimally trained user eyes trajectory prediction model is used for re-prediction.

Operation 811: Execute a prediction result based on the user eyes trajectory information in the current time period. In operation 811, the prediction result is executed. The sub-regions in the video images at the subsequent time points within the current time period are rendered based on the user eyes trajectory information in the current time period.

This embodiment of the is described in detail below with a few specific examples.

Specific example 1 is a scheme for determining the intention of a subject at which the user may gaze at the current time point through the attention model, and selecting whether to render or not.

Figure 10A:
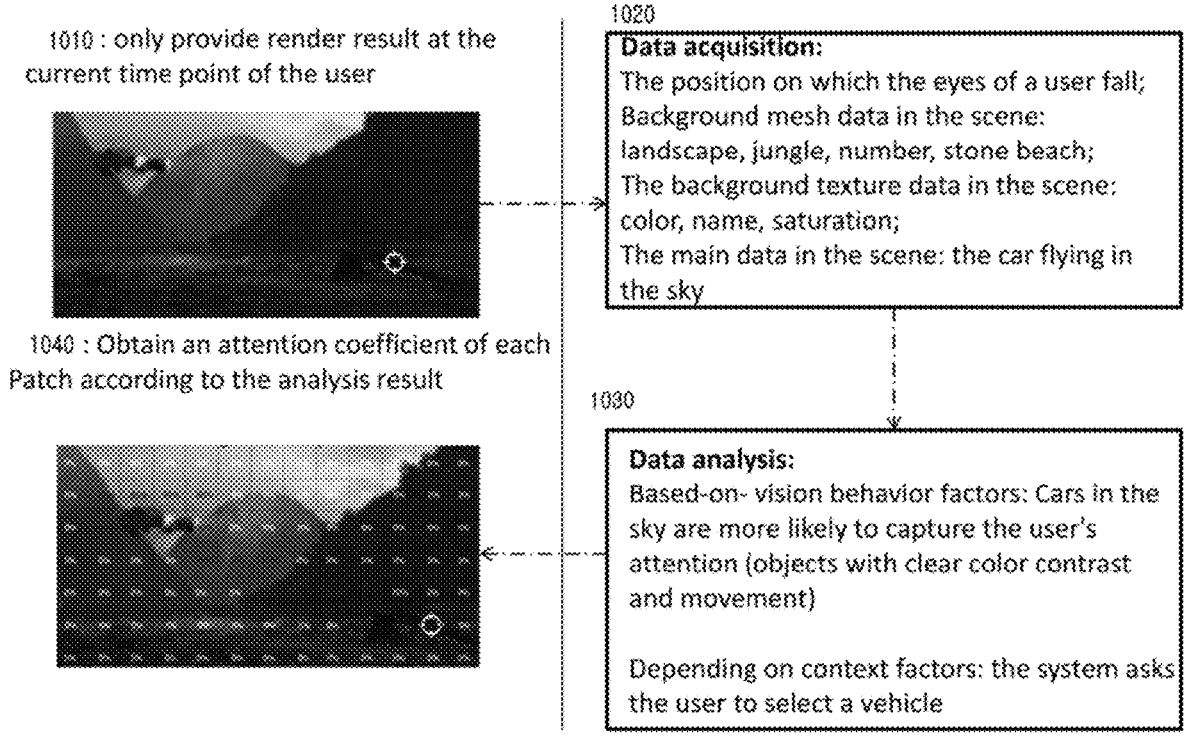
FIG. 10A is a flowchart of a target prediction process in specific example 1 according to an embodiment of the disclosure.

FIG. 10A is a flowchart of a target prediction process in specific example 1 according to an embodiment of the disclosure.

Referring to FIG. 10A, the process includes the following operations:

Operation 1010: Render, in advance, only a sub-region on which the eyes of a user fall at a current time point.

Operation 1020: Acquire user viewpoint feature information. In FIG. 10A, the process is represented as a data acquisition process.

Operation 1030: Analyze data by using an attention model. In FIG. 10A, during the data analysis, visual behavior factor information and context factor information are analyzed.

Operation 1040: Obtain an attention coefficient of each sub-region according to a grading result.

Figure 10B:
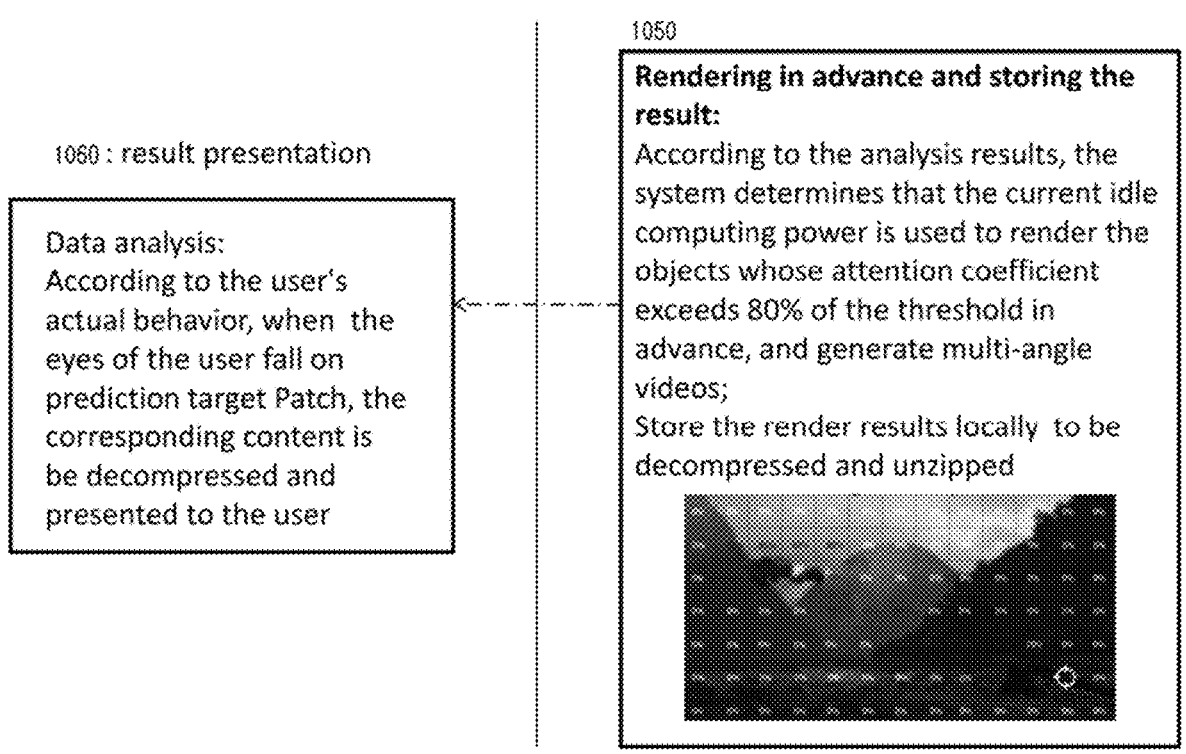
FIG. 10B is a schematic diagram of interaction between a user terminal and a system background of a VR device in specific example 1 according to an embodiment of the disclosure.

FIG. 10B is a schematic diagram of interaction between a user terminal and a system background of a VR device in specific example 1 according to an embodiment of the disclosure.

Referring to FIG. 10B, the process includes the following operations:

Operation 1050: Render each sub-region in advance according to the attention coefficient of each sub-region, and caching a rendering result.

Operation 1060: Present the rendering result to the user, and perform data analysis accordingly. In operation 1060, according to an actual behavior of the user, when the eyes of the user fall on a certain sub-region of a predicted target, the rendered sub-region may be presented to the user.

Specific example 2 is a scheme for predicting user eyes trajectory information.

FIG. 11 is a flowchart of a scheme for predicting user eyes trajectory information in specific example 2 according to an embodiment of the disclosure.

Referring to FIG. 11, the scheme includes the following operations:

Operation 1110: Render a sub-region on which the eyes of a user fall currently.

Operation 1120: Process a user eyes trajectory prediction model to obtain an analysis result. In operation 1120, the model analysis result includes: according to data in the scene, it is determined that the eyes of the user finally fall on a vehicle flying in the sky in the scene within a current time period.

Operation 1130: Evaluate an attention coefficient of each sub-region according to the analysis result. In operation 1130, an attention coefficient evaluation result shown in the right figure is provided according to the analysis result.

Operation 1140: Train the user eyes trajectory prediction model while performing operation 1130.

In the training process, user visual habit information is introduced, whereby the user eyes trajectory prediction model may obtain a user eyes trajectory different from that acquired in an initial state in the training process.

Specific example 3 is a method for predicting user eyes trajectory information in combination with the user visual habit information.

Figure 12A:
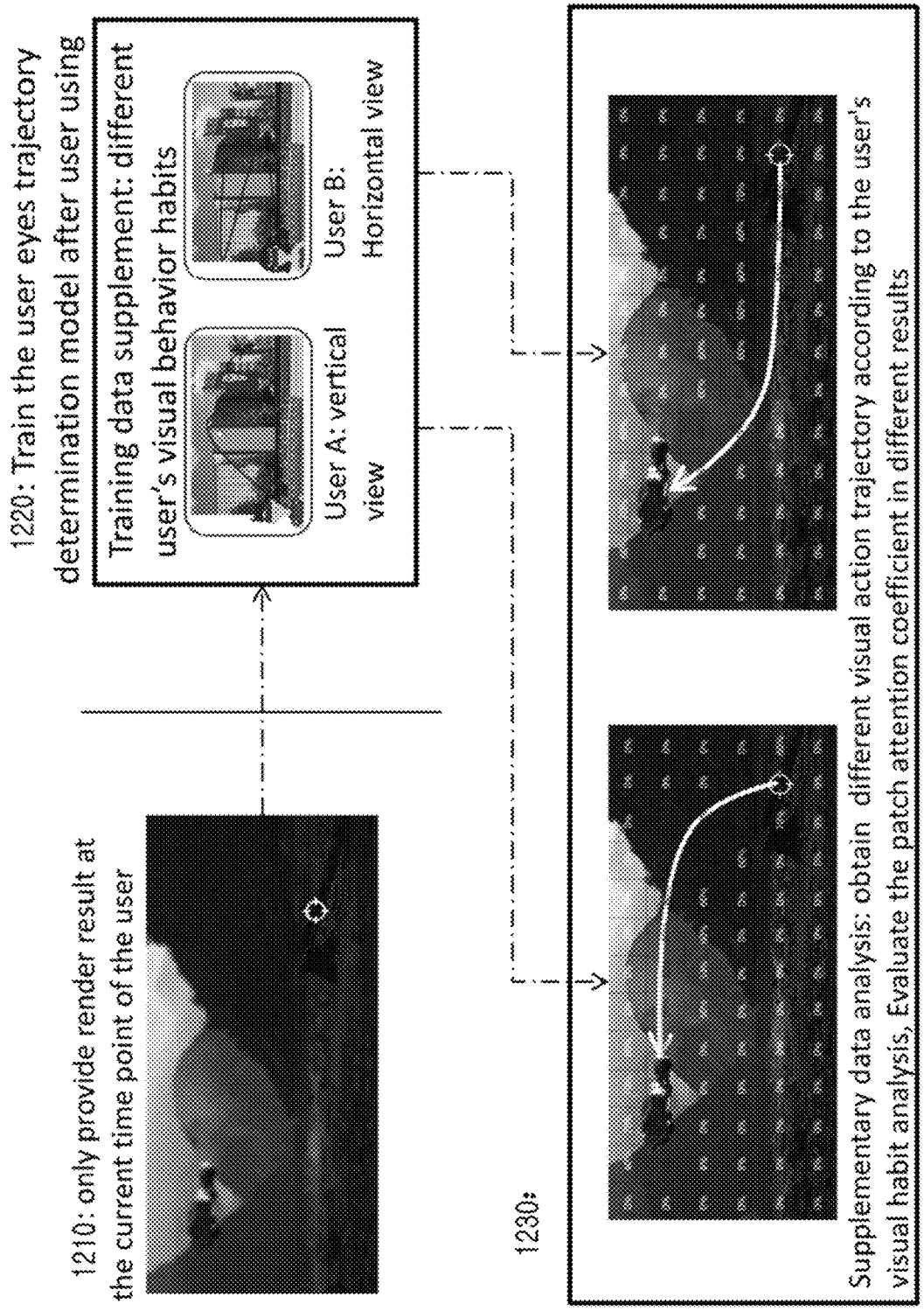
FIG. 12A shows user visual habit information in specific example 3 according to an embodiment of the disclosure.

FIG. 12A is a schematic diagram of a process of predicting user eyes trajectory information in combination with user visual habit information in specific example 3 according to an embodiment of the disclosure.

Referring to FIG. 12A, the process includes the following operations:

Operation 1210: Render a sub-region on which the eyes of a user fall currently.

Operation 1220: Train a user eyes trajectory prediction model.

In the training process, different user visual habit information is introduced.

Operation 1230: Evaluate eyes trajectories of different users obtained by the model, so as to adjust the user eyes trajectory prediction model subsequently.

FIG. 12B is a schematic diagram of a process of rendering different sub-regions in a video image based on user eyes trajectory information in specific example 3 according to an embodiment of the disclosure.

Referring to FIG. 12B, the process includes the following operations:

Operation 1240: Determine an attention coefficient of each sub-region in a video image according to the user eyes trajectories of different users obtained by analysis, render the sub-region with the attention coefficient exceeding 80% of an attention coefficient threshold in advance, and generate and store multi-angle video.

Operation 1250: Release, when the eyes of the user fall on a corresponding sub-region, a stored pre-rendering result of the sub-region according to an actual behavior of the user, so as to complete presentation in a VR scene.

Specific example 4 is a scheme for predicting user eyes trajectory according to this embodiment of the disclosure, which may also be applied to automatic automobile driving. By predicting the user eyes trajectory in advance, potential safety hazards that may be ignored are found, and early warning is carried out.

FIG. 13 is an implementation process diagram of specific example 4 according to an embodiment of the disclosure.

Referring to FIG. 13, the process includes the following operations:

Operation 1310: Equip a vehicle with an infrared camera capable of detecting eye movement data of a driver.

Operation 1320: Dynamically analyze a current gazing point of the driver in the driving process, and predict user eyes trajectory information by using an attention model and a user eyes trajectory prediction model.

Operation 1330: Compare user eyes trajectory information with driving path information, and extract and find potential safety driving hazard information that may exist outside the range of the user eyes trajectory information. In operation 1330, an attention coefficient of each sub-region in a video image at a subsequent time point may be obtained based on the user eyes trajectory information, and compare with a video image of a subsequent driving path accordingly to determine potential safety driving hazard information not found by a user.

Operation 1340: Remind the user of potential safety driving hazard information in subsequent driving by voice or other manners.

Figure 14:
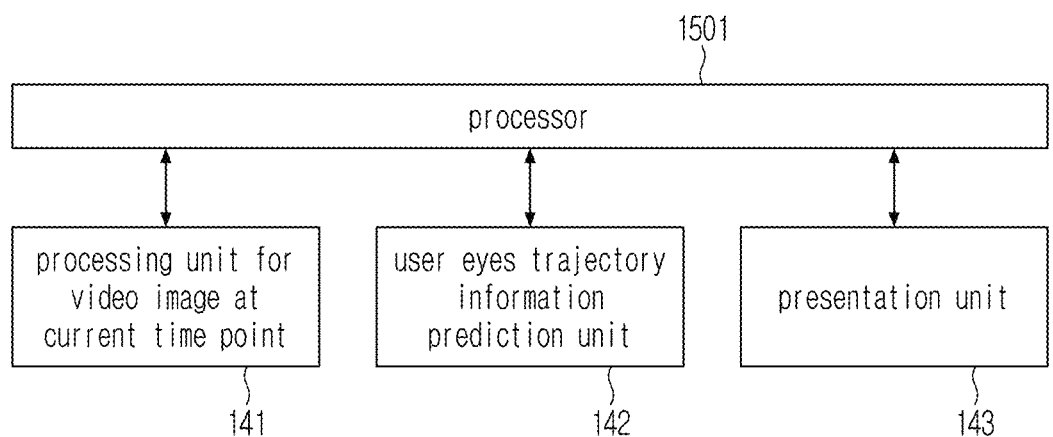
FIG. 14 is a schematic structural diagram of a system for rendering video images in VR scenes according to an embodiment of the disclosure.

FIG. 14 is a schematic structural diagram of a system for rendering video images in VR scenes according to an embodiment of the disclosure.

Referring to FIG. 13, the system includes a processing unit for video image at current time point 141, a user eyes trajectory information prediction unit 142, a processing unit for video image in current time period, and a processor 1501.

The processing unit for video image at current time point 141 is configured to provide a video image at a current time point, divide the video image at the current time point into a plurality of sub-regions, input image feature information of the sub-regions and acquired user viewpoint feature information into a trained attention model for processing to obtain attention coefficients of the sub-regions reflecting probability values at which user viewpoints at a next time point fall into the sub-regions, and render the sub-regions based on the attention coefficients of the sub-regions to obtain a rendered video image at the current time point.

The user eyes trajectory information prediction unit 142 is configured to input the attention coefficients of the sub-regions and the image feature information of the sub-regions into a trained user eyes trajectory prediction model for processing to obtain user eyes trajectory information in a current time period.

The processing unit for video image in current time period is configured to divide, for video images at subsequent time points within the current time period, the video images at the subsequent time points into a plurality of sub-regions, calculate attention coefficients of the sub-regions in the video image at each of the subsequent time points within the current time period respectively based on the user eyes trajectory information in the current time period, and render the corresponding sub-regions based on the attention coefficients of the sub-regions to obtain a rendered video image at each of the subsequent time points.

The system further includes a presentation unit 143. The presentation unit is configured to release the rendered video images at the time points within the time period chronologically, collect user viewpoint information at the corresponding time points, and form, when the user viewpoint information falls into a sub-region in the rendered video images, a VR scene for presentation from the corresponding rendered sub-region.

As can be seen from this embodiment of the disclosure, content to be viewed by a user may be rendered in advance by predicting user eyes trajectory information. In some specific application scenes, such as VR device display, a preparation time for hardware implementation is provided, and the use experience of the user is also ensured. By predicting the user eyes trajectory information, natural interaction in some visual scenes may be realized, whereby human-computer interaction is more easily accepted by the user.

In another embodiment of the disclosure, a non-transitory computer-readable storage medium is provided. The non-transitory computer-readable storage medium stores instructions that, when executed by a processor, cause the processor to perform the method for rendering video images in VR scenes in the foregoing embodiment.

Figure 15:
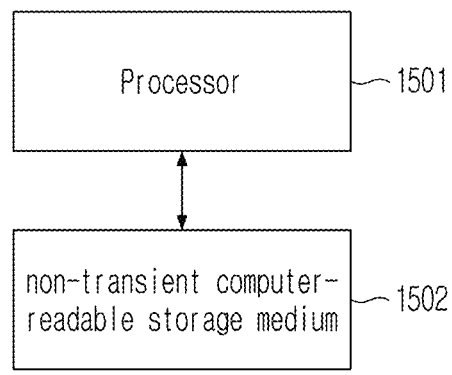
FIG. 15 is a schematic diagram of an electronic device according to an embodiment of the disclosure.

FIG. 15 is a schematic diagram of an electronic device according to an embodiment of the disclosure.

Referring to FIG. 15, an electronic device is illustrated, which may include a processor 1501. The processor 1501 is configured to perform the steps of the method for rendering video images in VR scenes. As can also be seen from FIG. 15, the electronic device according to the above embodiment further includes a non-transitory computer-readable storage medium 1502. The non-transitory computer-readable storage medium 1502 stores computer programs. The computer programs, when executed by the processor 1501, implement the steps of the method for rendering video images in VR scenes.

Specifically, the non-transitory computer-readable storage medium 1502 may be a general purpose storage medium, such as a removable disk, a hard disk, a FLASH, a read-only memory (ROM), an erasable programmable read-only memory (EPROM or flash), or a portable compact disc read-only memory (CD-ROM). When the computer program on the non-transitory computer-readable storage medium 1502 is executed by the processor 1501, the processor 1501 may be caused to perform the various steps of the method for rendering video images in VR scenes.

In practice, the non-transitory computer-readable storage medium 1502 may be included in a device/apparatus/system described in the above embodiment, or may exist alone without being assembled into the device/apparatus/system. The computer-readable storage medium carries one or more programs. When the one or more programs are executed, the various steps of the method for rendering video images in VR scenes may be performed.

Another embodiment of the disclosure also provides a computer program product including computer programs or instructions. The computer programs or instructions, when executed by a processor, implement the various steps of the method for rendering video images in VR scenes.

The flowcharts and block diagrams in the drawings of the disclosure illustrate possible implementations of the architecture, functions, and operations of systems, methods, and computer program products in accordance with various embodiments disclosed by the disclosure. In this regard, each block in the flowchart or the block diagram may represent a module, a program segment, or part of code. The module, the program segment, or the part of code contains one or more executable instructions for implementing a specified logical function. It should also be noted that in some alternative implementations, the functions indicated in the block may also occur in the order indicated in different drawings. For example, two jointed blocks may actually be executed substantially in parallel, or may sometimes be executed in reverse order, depending on the functionality involved. It is also noted that each block in the block diagram or the flowchart and a combination of blocks in the block diagram or the flowchart may be implemented in a dedicated hardware-based system that performs a specified function or operation, or may be implemented in a combination of dedicated hardware and computer instructions.

Those skilled in the art will appreciate that the features recited in the various embodiments and/or claims of the disclosure may be combined and/or integrated in a variety of ways, even if such assemblies or combinations are not explicitly recited in the disclosure. In particular, without departing from the spirit and teachings of the disclosure, various assemblies or combinations of features set forth in various embodiments and/or claims of the disclosure may be made, and such assemblies or combinations fall within the scope of the disclosure.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for rendering video images in virtual reality (VR) scenes, the method comprising:
   providing a video image at a current time point;
   dividing the video image at the current time point into a plurality of sub-regions;
   inputting image feature information of the sub-regions and acquired user viewpoint feature information into a trained attention model for processing to obtain attention coefficients of the sub-regions indicating probability values at which user viewpoints at a next time point fall into the sub-regions;
   rendering the sub-regions based on the attention coefficients of the sub-regions to obtain a rendered video image at the current time point;
   inputting the attention coefficients of the sub-regions and the image feature information of the sub-regions into a trained user eyes trajectory prediction model for processing;
   obtaining user eyes trajectory information in a current time period;
   dividing, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period; and
   rendering the corresponding sub-regions based on the attention coefficients of the sub-regions to obtain a rendered video image at each of the subsequent time points.

2. The method according to claim 1, the method further comprising:
releasing the rendered video images at the time points within the time period chronologically;
collecting user viewpoint information at the corresponding time points; and
forming, when the user viewpoint information falls into a sub-region in the rendered video images, the sub-region rendered into a VR scene for presentation.

3. The method according to claim 1,
wherein the acquired user viewpoint feature information comprises visual behavior factor information and context factor information,
wherein the visual behavior factor information comprises texture information textures of the sub-regions, mesh information meshes of the sub-regions, and position information of the sub-regions, and
wherein the context factor information comprises user intention expression data, text data, voice conversation data, system guidance data, and Task directivity data.

4. The method according to claim 1,
wherein a manner of dividing the video image at the current time point into the plurality of sub-regions and a manner of dividing the video images at the subsequent time points into the plurality of sub-regions are the same, and
wherein the dividing the video image at the current time point and the dividing the video images at the subsequent time points comprises:
mapping the video image into a two-dimensional video image, the video image being a VR scene within a user eyes range defined by a sum of a field of view (FOV) of the user eyes and a set angle $\alpha$; and
inputting image feature information of the two-dimensional video image into a trained division model to obtain a plurality of sub-regions divided and corresponding user viewpoint feature information.

5. The method according to claim 1, wherein before obtaining the attention coefficients of the sub-regions, the method further comprises:
processing the sub-regions based on a foveal principle to obtain the attention coefficients of the sub-regions.

6. The method according to claim 1, wherein a training process of the user eyes trajectory prediction model comprises:
inputting the attention coefficients of the sub-regions in the video image at the current time point and the image feature information of the sub-regions into a user trajectory prediction model established based on user visual habit information for training, and outputting user eyes trajectory probability values of the sub-regions;
determining a ground truth (GT) of the user eyes trajectory prediction model by using a user eyes trajectory of a user gazing from the sub-regions to adjacent sub-regions; and
adjusting the user trajectory prediction model based on the user visual habit information in the training process until the training is completed.

7. The method according to claim 1, wherein the obtaining the user eyes trajectory information in the current time period further comprises:
determining, based on real eyes trajectory information of the user within the current time period, whether the user eyes trajectory information in the current time period directly obtained by processing through the user eyes trajectory prediction model is accurate;
if the user eyes trajectory information is accurate, taking the user eyes trajectory information in the current time period directly obtained by processing through the user eyes trajectory prediction model as the obtained user eyes trajectory information in the current time period; and
if the user eyes trajectory information is not accurate, the real eyes trajectory information of the user within the current time period as the obtained user eyes trajectory information in the current time period, and optimally training the user eyes trajectory prediction model based on the real eyes trajectory information of the user within the current time period.

8. The method according to claim 1, wherein the calculating of the attention coefficients of the sub-regions in the video image at each of the subsequent time points within the current time period respectively based on the user eyes trajectory information in the current time period comprises:
determining, for a sub-region in the video image at each of the subsequent time points within the current time period, whether the user eyes fall into the sub-region based on the user eyes trajectory information in the current time period, enhancing, if yes, the attention coefficient of the sub-region according to a set amplitude on the basis of the attention coefficient at a corresponding previous time point, and decreasing, if no, the attention coefficient of the sub-region according to the set amplitude on the basis of the attention coefficient at the corresponding previous time point.

9. The method according to claim 1, wherein the rendering the corresponding sub-regions based on the attention coefficients of the sub-regions comprises:
setting an attention coefficient threshold, determining whether the attention coefficients of the sub-regions exceed the attention coefficient threshold set, rendering, if yes, the sub-regions using a set high-level rendering mode, and rendering, if no, the sub-regions using a set low-level rendering mode.

10. An electronic device, comprising:
memory storing one or more computer programs; and
one or more processors communicatively coupled to the memory,
wherein the one or more computer programs include computer-executable instructions that, when executed by the one or more processors, cause the electronic device to:
provide a video image at a current time point,
divide the video image at the current time point into a plurality of sub-regions, inputting image feature information of the sub-regions and acquired user viewpoint feature information into a trained attention model for processing to obtain attention coefficients of the sub-regions indicating probability values at which user viewpoints at a next time point fall into the sub-regions,
render the sub-regions based on the attention coefficients of the sub-regions to obtain a rendered video image at the current time point,
input the attention coefficients of the sub-regions and the image feature information of the sub-regions into a trained user eyes trajectory prediction model for processing,
obtain user eyes trajectory information in a current time period, and
divide, for video images at subsequent time points within the current time period, the video images at the subsequent time points into a plurality of sub-regions, calculating attention coefficients of the sub-regions in a video image at each of the subsequent time points within the current time period respectively based on the user eyes trajectory information in the current time period, and render the corresponding sub-regions based on the attention coefficients of the sub-regions to obtain a rendered video image at each of the subsequent time points.

11. The electronic device according to claim 10, wherein the one or more computer programs further include instructions that, when executed by the one or more processors, cause the electronic device to:

release the rendered video images at the time points within the time period chronologically;

collect user viewpoint information at the corresponding time points; and form, when the user viewpoint information falls into a sub-region in the rendered video images, the sub-region rendered into a VR scene for presentation.

12. The electronic device according to claim 10, wherein the acquired user viewpoint feature information comprises visual behavior factor information and context factor information, wherein the visual behavior factor information comprises texture information textures of the sub-regions, mesh information meshes of the sub-regions, and position information of the sub-regions, and wherein the context factor information comprises user intention expression data, text data, voice conversation data, system guidance data, and Task directivity data.

13. The electronic device according to claim 10, wherein a manner of dividing the video image at the current time point into the plurality of sub-regions and a manner of dividing the video images at the subsequent time points into the plurality of sub-regions are the same, and wherein the one or more computer programs further include instructions that, when executed by the one or more processors, cause the electronic device to:

map the video image into a two-dimensional video image, the video image being a VR scene within a user eyes range defined by a sum of a field of view (FOV) of the user eyes and a set angle $\alpha$, and input image feature information of the two-dimensional video image into a trained division model to obtain a plurality of sub-regions divided and corresponding user viewpoint feature information.

14. The electronic device according to claim 10, wherein the one or more computer programs further include instructions that, when executed by the one or more processors, cause the electronic device to:

before obtaining the attention coefficients of the sub-regions, process the sub-regions based on a foveal principle to obtain the attention coefficients of the sub-regions.

15. A system for rendering video images in virtual reality (VR) scenes, the system comprising:

a processing unit for video image at current time point;
a user eyes trajectory information prediction unit; and
a processing unit for video image in current time period, wherein the processing unit for video image at current time point is configured to:

provide a video image at a current time point, divide the video image at the current time point into a plurality of sub-regions, input image feature information of the sub-regions and acquired user viewpoint feature information into a trained attention model for processing to obtain attention coefficients of the sub-regions indicating probability values at which user viewpoints at a next time point fall into the sub-regions, and render the sub-regions based on the attention coefficients of the sub-regions to obtain a rendered video image at the current time point, wherein the user eyes trajectory information prediction unit is configured to:

input the attention coefficients of the sub-regions and the image feature information of the sub-regions into a trained user eyes trajectory prediction model for processing, and obtain user eyes trajectory information in a current time period, and wherein the processing unit for video image in current time period is configured to:

divide, for video images at subsequent time points within the current time period, the video images at the subsequent time points into a plurality of sub-regions, calculate attention coefficients of the sub-regions in a video image at each of the subsequent time points within the current time period respectively based on the user eyes trajectory information in the current time period, and render the corresponding sub-regions based on the attention coefficients of the sub-regions to obtain a rendered video image at each of the subsequent time points.

16. The system of claim 15, further comprising a presentation unit configured to:

release the rendered video images at the time points within the time period chronologically, collect user viewpoint information at the corresponding time points, and form, when the user viewpoint information falls into a sub-region in the rendered video images, a VR scene for presentation from the corresponding rendered sub-region.

17. The system of claim 16, wherein the processing unit for video image at current time point, the user eyes trajectory information prediction unit, the processing unit for video image in current time period, and the presentation unit are included in a VR display device, and wherein the VR display device includes a display configured to display the VR scene for presentation.

18. The system of claim 15, wherein the acquired user viewpoint feature information comprises visual behavior factor information and context factor information, wherein the visual behavior factor information comprises texture information textures of the sub-regions, mesh information meshes of the sub-regions, and position information of the sub-regions, and wherein the context factor information comprises user intention expression data, text data, voice conversation data, system guidance data, and Task directivity data.

19. One or more non-transitory computer-readable storage media storing one or more computer programs including computer-executable instructions that, when executed by one or more processors of an electronic device, cause the electronic device to perform operations, the operations comprising:

providing a video image at a current time point;
dividing the video image at the current time point into a plurality of sub-regions;
inputting image feature information of the sub-regions and acquired user viewpoint feature information into a trained attention model for processing to obtain attention coefficients of the sub-regions indicating probability values at which user viewpoints at a next time point fall into the sub-regions;
rendering the sub-regions based on the attention coefficients of the sub-regions to obtain a rendered video image at the current time point;
inputting the attention coefficients of the sub-regions and the image feature information of the sub-regions into a trained user eyes trajectory prediction model for processing;
obtaining user eyes trajectory information in a current time period;
dividing, for video images at subsequent time points within the current time period, the video images at the subsequent time points into a plurality of sub-regions,
calculating attention coefficients of the sub-regions in a video image at each of the subsequent time points within the current time period respectively based on the user eyes trajectory information in the current time period; and
rendering the corresponding sub-regions based on the attention coefficients of the sub-regions to obtain a rendered video image at each of the subsequent time points.

20. The one or more non-transitory computer-readable storage media of claim 19, the operations further comprising:
releasing the rendered video images at the time points within the time period chronologically;
collecting user viewpoint information at the corresponding time points; and
forming, when the user viewpoint information falls into a sub-region in the rendered video images, the sub-region rendered into a VR scene for presentation.

* * * * *